J. F. APPLEBY
HARVESTER.
APPLICATION FILED FEB. 8, 1910. RENEWED FEB. 24, 1913.
1,069,997.
Patented Aug. 12, 1913.
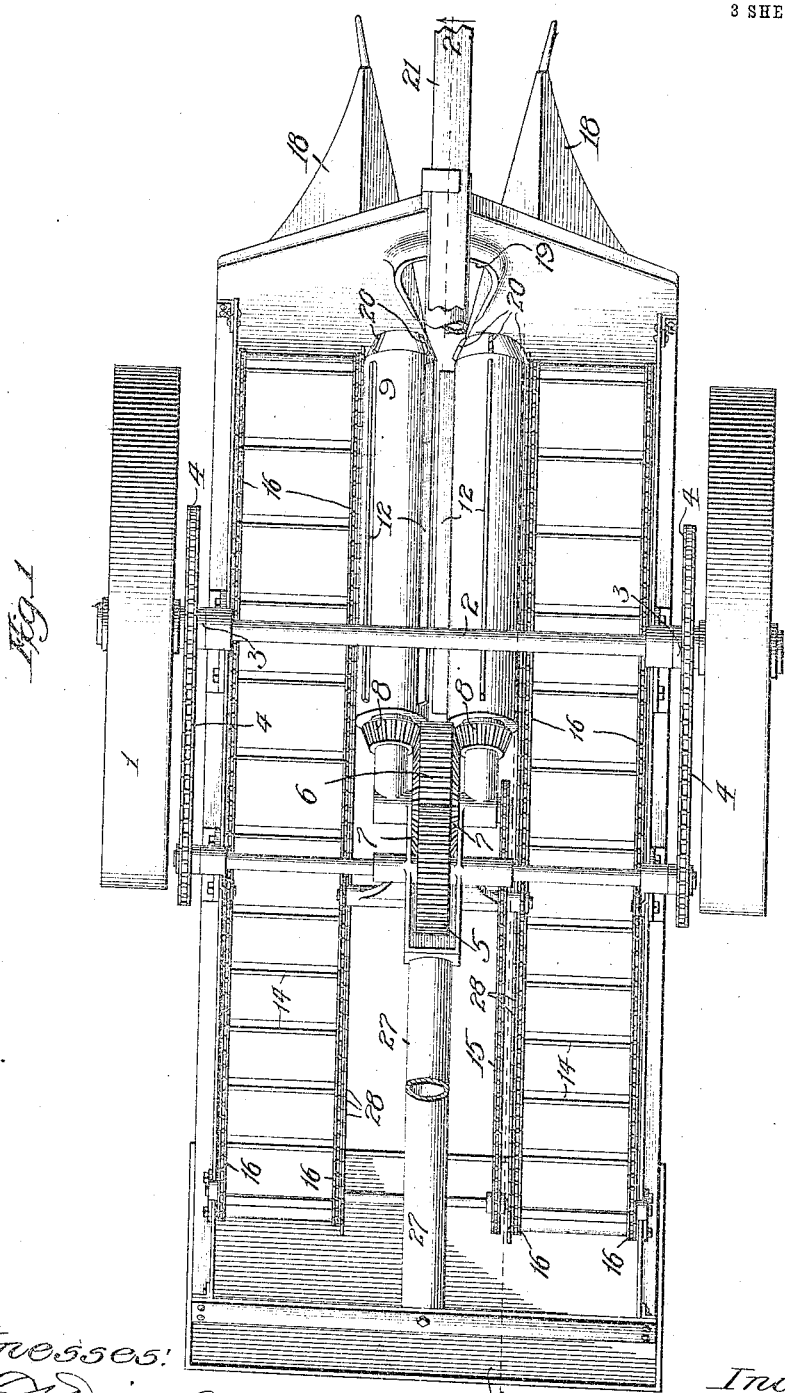
Witnesses:
Inventor:
John F. Appleby

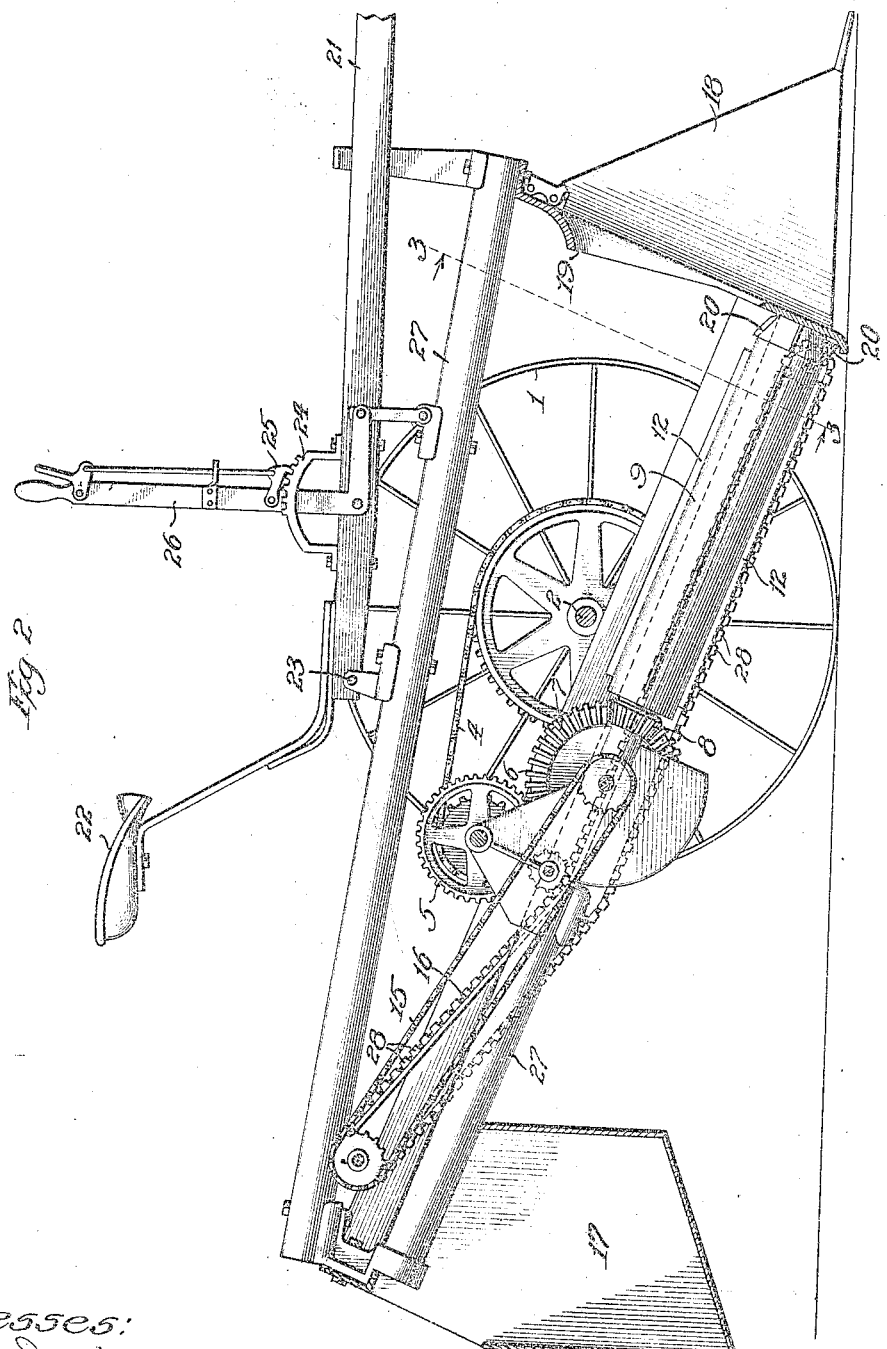

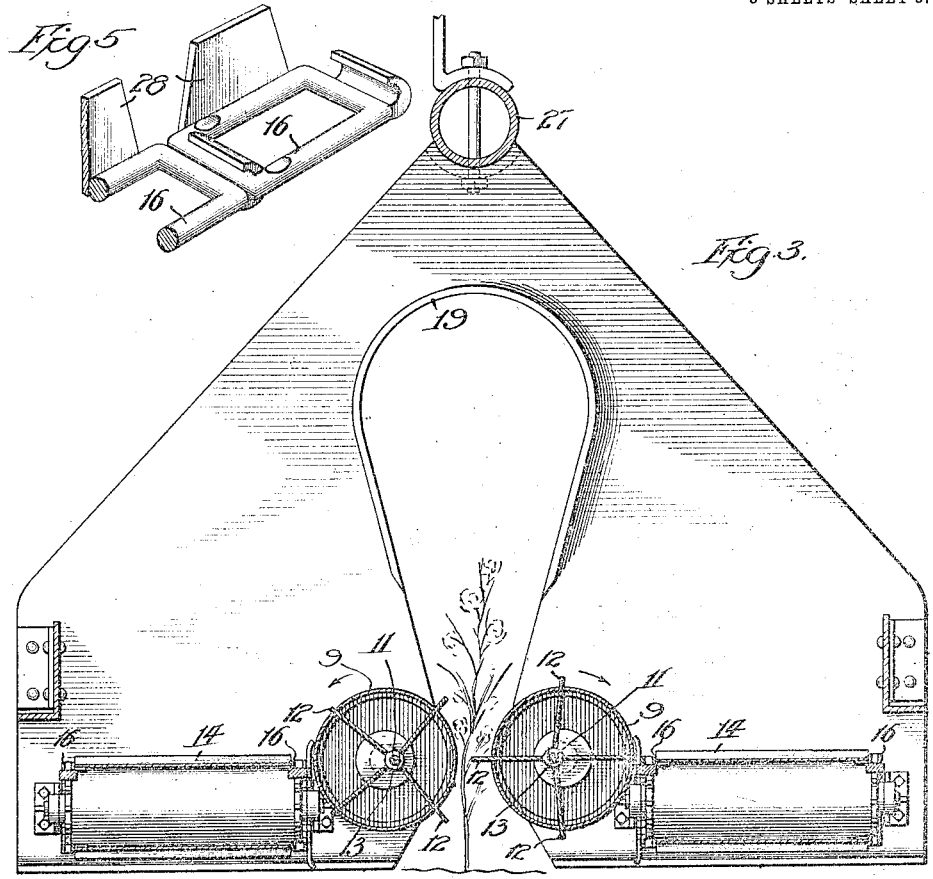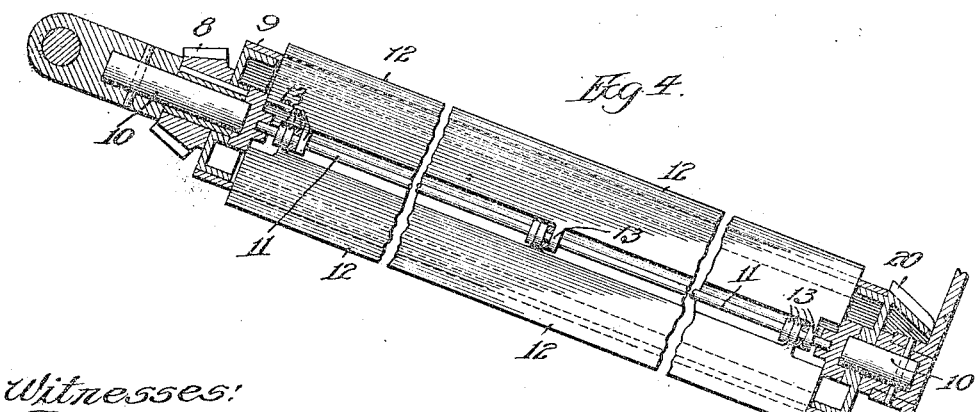

UNITED STATES PATENT OFFICE.

JOHN F. APPLEBY, OF CHICAGO, ILLINOIS, ASSIGNOR TO DIXIE COTTON PICKER COMPANY, OF CHICAGO, ILLINOIS, A CORPORATION OF SOUTH DAKOTA.

HARVESTER.

1,069,997.

Specification of Letters Patent. Patented Aug. 12, 1913.

Application filed February 8, 1910, Serial No. 542,795. Renewed February 24, 1913. Serial No. 750,414.

*To all whom it may concern:*

Be it known that I, JOHN F. APPLEBY, citizen of the United States, residing at Chicago, in the county of Cook and State of Illinois, have invented a certain new and useful Improvement in Harvesters, of which the following is a full, clear, concise, and exact description, reference being had to the accompanying drawings, forming a part of this specification.

My invention relates to harvesting machines and is well adapted to harvest corn in the ear and to remove cotton bolls that are well adapted for use in the arts, and which bolls are particularly serviceable in the formation of fibrous pulp from which paper and other commodities may be manufactured.

In practising my invention, I employ as a gathering element a rotating body which is ribbed longitudinally of its axis of rotation, there being another body between which and the said rotating body plants or stalks may be confined as the machine is traveling through the field. This other body is also desirably a rotating body similar to the first mentioned rotating body and similarly provided with ribs. The rotating bodies are desirably of hollow cylindrical formation into and out of which the ribs are moved by suitable actuating mechanism, the movements of the ribs being so timed that they are projected to their outermost extents when the cylinders have brought the ribs to their nearest relative positions, these ribs then best serving to engage the ears of corn, the cotton bolls, or other plant product which is to be removed, and preferably serving to transfer the removed product to suitable conveying mechanism located alongside and longitudinally of the rollers. The conveying mechanism, which is of any suitable form, is located close beside the rolls, the ribs being withdrawn to their farthest extent within the rollers when opposite the conveyers in order that the product removed by the ribs may readily drop upon the conveyers from the rollers without liability of falling between the conveyers and the rollers. The ribs upon each cylinder, as the cylinders are rotated, desirably interleave or intermesh with the ribs upon the companion cylinder so that the plant product that is being removed is forced to come into contact with the gathering ribs, whereby the removal of the maximum quantity of plant product is assured.

I will explain my invention more fully by reference to the accompanying drawings, showing the preferred embodiment thereof, in which—

Figure 1 is a plan view; Fig. 2 is a sectional elevation on line 2 2 of Fig. 1; Fig. 3 is a sectional view on a large scale on line 3 3 of Fig. 2; Fig. 4 is a longitudinal sectional view taken through the axis of one of the rollers or cylinders, certain of the parts being shown in complete elevation and portions being broken away due to lack of space; and Fig. 5 is a fragmentary perspective view of the conveyer chain.

Like parts are indicated by similar characters of reference throughout the different figures.

The mechanism of my invention desirably includes but two traction wheels 1 1 that are free to rotate upon the main shaft 2 in so far as such rotation will be permitted by well known clutching devices 3 which need not be illustrated, as their construction and purpose is well understood, their function being to permit differential motion between the traction wheels as the harvester rounds curves, these clutching devices effecting fixed relation between said wheels and shaft when the harvester is being pulled forward in a straight line, and rotating freely upon the shaft when the harvester is being backed. Two sprocket chains 4 4 are driven by the traction wheels when the harvester is moving forward either in a curved or straight line and are not driven when the rotation of the traction wheels is reversed. These sprocket chains are in suitable driving relation with a spur gear 5 by instrumentalities which are illustrated in a general way and which are so well understood by those skilled in the art as to require no detailed description or illustration. The spur gear drives another spur gear 6 that is in mesh therewith, and the spur gear 6 in turn drives bevel gears 7 that are preferably integrally formed therewith. The bevel gears 7 are in mesh with bevel pinions 8 fixed with respect to the cylindrical rollers 9. The cylindrical rollers are journaled to rotate upon non-rotating stub shafts 10 that are suitably mounted upon framework portions of the harvester. A journal rod 11, preferably rigid with respect to the stub shafts 10, is eccentric with respect to the common axis of said stub shafts and rollers, the axis of the rod or shaft 11 being parallel with and included within the same plane containing said common axis.

Four ribs 12, spaced 90° apart, extend at their outer ends through slots in the rollers or cylinders 9 and are journaled at their inner ends upon the non-rotating shaft or rod 11, said ribs desirably having for this purpose inner ear extensions 13 that encircle the shaft. The ribs extend along the length of the rollers, which disposition of the ribs I term a longitudinal disposition of the ribs along the rollers, and I do not desire to be limited to the longitudinal disposition of the ribs illustrated. The degree of eccentricity of the shaft with respect to the stub shafts 10 is desirably such that when the ribs are bodily rotated with the cylinders and have their outer longitudinal edges at the middle of the machine, as indicated at the right in Fig. 3, such ribs will be projected to their outermost extents, each rib being gradually withdrawn during its succeeding half revolution until its outer end is flush with the periphery of the roller housing it, also as indicated in connection with the right hand roller in Fig. 3, each such rib being thereafter gradually projected until it is projected to its fullest extent during its next bodily half revolution. The ribs of each roller are in interleaving or intermeshing relation with the ribs of the other roller, whereby the ribs of one roller are brought into opposition with the cylindrical portions of the other roller when occupying insetting horizontal positions. Where the rollers are close enough together, the ribs desirably project more than half way across the space intervening between the rollers so as to insure the contact of all the plant products that are to be removed by the ribs. It will be observed that the cylindrical portion of each roller acts as a resisting surface for the ribs of the companion roller, whereby the plant products are sufficiently confined between the rib that is acting to strip the plant product from the plant and the coacting resisting surface. As I have preferably organized the machine, the rollers are caused to rotate in opposite directions with the upper portions of the rollers moving away from each other. The machine organized as illustrated is thus caused to pull the plant products from the plant, each rib acting in direct coöperation with the cylindrical portion of the roller presented to it, rather than in direct coöperation with a rib upon the companion roller, whereby the plant products are not pinched, but I do not wish to be limited to this relative arrangement of the ribs. By causing the ribs to be withdrawn gradually within the circumferences of the rollers when they are brought to their outsetting horizontal positions, I am enabled first to effect the removal of the plant products from these ribs and second to place conveyers 14 in close proximity to the rollers and in positions to permit the rollers to discharge the plant products thereupon. These conveyers 14 may be of any suitable formation, the common form of belt conveyers being illustrated in the drawings, these belt conveyers being driven by sprocket chains 15 16. The plant products discharged upon the belt conveyers are conveyed upwardly and are discharged from the belt conveyers into a suitable receptacle 17. These belt conveyers are parallel with the rollers, the upper stretches thereof desirably lying in the same plane that includes the axes of the rollers.

In order to enable the machine of my invention to strip plant products from plants of varying heights and in order that the plants may be presented at the proper angle to the stripping ribs, I incline the rollers downwardly toward the front of the machine. By inclining the rollers downwardly, plant products at differing heights upon the plants are brought into contact with the gathering ribs. The machine is provided with two directing fenders 18 at its forward end, whereby the plants are gathered laterally and are guided thereby into the space between the rollers. These gathering fenders are provided with a yoke 19 at their rear, through the opening in which the plants are passed, the top of the yoke pressing the taller plants into proper positions to be operated upon by the rollers. The shaft 2 of the machine is located in front of the gearing and serves further to depress the plants to insure the engagement of their products by the gathering ribs and to prevent the plants from becoming entangled in the roller operating gearing located to the rear of said shaft. Some other means beside the shaft, however, may be provided for this purpose. In order to insure the gathering of plant products that may lie close to the ground, I provide supplemental ribs 20 upon the bottoms of the rollers and in the same planes with the ribs 12, these supplemental ribs desirably sloping forwardly toward the axes of the rollers so that they may lie parallel with the ground when in their lowermost positions. These ribs 20 need not be arranged to be withdrawn into the rollers since they serve mainly to bring the lowermost plant products within the range of operation of the ribs 12, the conveyers 14, therefore, not being in direct coöperative relation with the ribs 20. The machine may be equipped with a draft tongue 21 so as to permit it to be drawn by a pair of horses, a seat 22 being disposed upon the vehicle for the driver. The entire roller mechanism and the gearing for operating it is mounted to swing bodily about the pivot 23. A locking segment 24 coöperates with a locking dog 25 to hold the manually operated mechanism 26 in any position to which it may be adjusted, this lever mechanism being mounted upon the tongue of the harvester and connected with the framework 27 carrying the roller mechanism, so that an adjustment of the lever mechanism will cause a swinging adjustment of the roller mechanism about the pivot 23.

An important feature of my present invention resides in providing upwardly extending flanges 28 individual to the links of the sprocket chains 16 that are adjacent to the rollers 9. Each link of each of these chains is desirably though not necessarily provided with such a flange. These flanges act as fenders to prevent the removed plant products from falling between the rollers and conveyers and to direct the plant products upon the conveyers, the flanges also acting as inner side walls to the conveyers to prevent the discharge of plant products laterally from the conveyers toward the rollers. The flanges in their movements longitudinally of the rollers also serve actively to promote the transfer of the plant products from the rollers to the conveyers and to remove obstructions that otherwise might accumulate between the conveyers and the rollers.

I use the term "ribs" in the sense of a structural element that possesses a scraping edge or an edge that is adapted to engage with a plant product portion to be removed without causing such plant product portion to become impaled. It is very obvious that impaling elements would not accomplish the results that my invention is aimed at. I use the term "roller" in the broad sense of a rotating body, whether of circular or other cross section.

While I have herein shown and particularly described the preferred embodiment of my invention, I do not wish to be limited to the precise details of construction shown as changes may readily be made without departing from the spirit of the invention, but,

Having thus described my invention, I claim as new and desire to secure by Letters Patent the following:—

1. A harvesting machine including two plant product gathering rollers provided with ribs movable toward and from the peripheries of their respective rollers and disposed longitudinally of the rollers and arranged to permit the plants to pass therebetween, thereby to permit the ribs to engage the plant products and remove the same from the plants, mechanism for causing the rollers to rotate in opposite directions with the upper portions of the rollers moving away from each other, said ribs intermeshing or interleaving as the rollers rotate, the body portion of each roller being close to the nearest rib upon the other roller, whereby the said body portion acts as a resisting surface against which the rib that is in the act of removing plant products may press the plants, mechanism whereby the ribs are withdrawn toward their respective rollers after they have operated to remove plant products, and conveyers located in close proximity to the rollers where the ribs are withdrawn.

2. A harvesting machine including two plant product gathering rollers provided with ribs movable toward and from the peripheries of their respective rollers and disposed longitudinally of the rollers and arranged to permit the plants to pass therebetween, thereby to permit the ribs to engage the plant products and remove the same from the plants, said ribs intermeshing or interleaving as the rollers rotate, the body portion of each roller being close to the nearest rib upon the other roller, whereby the said body portion acts as a resisting surface against which the rib that is in the act of removing plant products may press the plants, mechanism whereby the ribs are withdrawn toward their respective rollers after they have operated to remove plant products, and conveyers located in close proximity to the rollers where the ribs are withdrawn.

3. A harvesting machine including two plant product gathering rollers provided with ribs movable toward and from the peripheries of their respective rollers and disposed longitudinally of the rollers and arranged to permit the plants to pass therebetween, thereby to permit the ribs to engage the plant products and remove the same from the plants, mechanism whereby the ribs are withdrawn toward their respective rollers after they have operated to remove plant products, and conveyers located in close proximity to the rollers where the ribs are withdrawn.

4. A harvesting machine including two plant product gathering rollers provided with ribs movable toward and from the peripheries of their respective rollers and disposed longitudinally of the rollers and arranged to permit the plants to pass therebetween, thereby to permit the ribs to engage the plant products and remove the same from the plants, mechanism for causing the rollers to rotate in opposite directions with the upper portions of the rollers moving away from each other, said ribs intermeshing or interleaving as the rollers rotate, the body portion of each roller being close to the nearest rib upon the other roller, whereby the said body portion acts as a resisting surface against which the rib that is in the act of removing plant products may press the plants, and mechanism whereby the ribs are withdrawn toward their respective rollers after they have operated to remove plant products.

5. A harvesting machine including two plant product gathering rollers provided with ribs movable toward and from the peripheries of their respective rollers and disposed longitudinally of the rollers and arranged to permit the plants to pass therebetween, thereby to permit the ribs to engage the plant products and remove the same from the plants, said ribs intermeshing or interleaving as the rollers rotate, the body portion of each roller being close to the nearest rib upon the other roller, whereby the said body portion acts as a resisting surface against which the rib that is in the act of removing plant products may press the plants, and mechanism whereby the ribs are withdrawn toward their respective rollers after they have operated to remove plant products.

6. A harvesting machine including two plant product gathering rollers provided with ribs movable toward and from the peripheries of their respective rollers and disposed longitudinally of the rollers and arranged to permit the plants to pass therebetween, thereby to permit the ribs to engage the plant products and remove the same from the plants, and mechanism whereby the ribs are withdrawn toward their respective rollers after they have operated to remove plant products.

7. A harvesting machine including a plant product gathering roller provided with a rib movable toward and from the periphery of its roller and disposed longitudinally of the roller, a resisting body between which and the roller the plants may pass, mechanism whereby the rib is projected from said roller toward said resisting body when turned toward it and is withdrawn toward its roller after it has coöperated with said resisting body to remove plant products, and a conveyer located in close proximity to the roller where the rib is withdrawn.

8. A harvesting machine including a plant product gathering roller provided with a rib movable toward and from the periphery of its roller and disposed longitudinally of the roller, a resisting body between which and the roller the plants may pass, and mechanism whereby the rib is projected from said roller toward said resisting body when turned toward it and is withdrawn toward its roller after it has coöperated with said resisting body to remove plant products.

9. A harvesting machine including a plant product gathering roller provided with a rib movable toward and from the periphery of its roller and disposed longitudinally of the roller, a resisting body between which and the roller the plants may pass, mechanism whereby the rib is projected from said roller toward said resisting body when turned toward it and is withdrawn toward its roller after it has coöperated with said resisting body to remove plant products, and a conveyer located in close proximity to the roller where the rib is withdrawn, said conveyer having a wall portion adjacent to the roller and serving to direct plant products from the roller to the conveyer.

In witness whereof, I hereunto subscribe my name this 13th day of January, A. D. 1910.

JOHN F. APPLEBY.

Witnesses:
G. L. CRAGG,
R. E. ATHERTON.